J. C. EAKENS.
TIRE FOR WHEELS.
APPLICATION FILED DEC. 9, 1914.
1,255,115.
Patented Jan. 29, 1918.
3 SHEETS—SHEET 1.
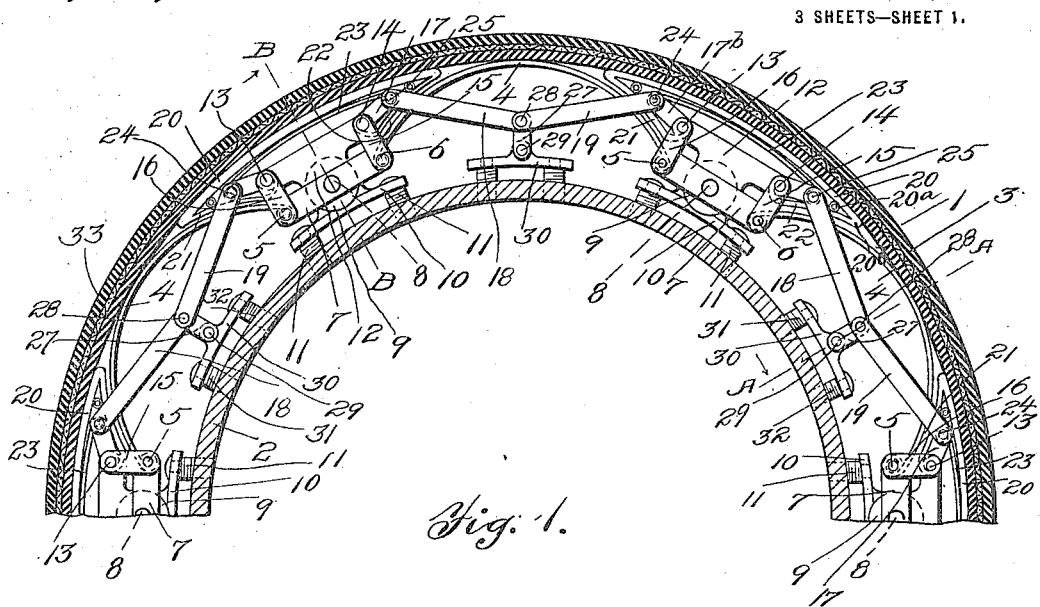
Fig. 1.
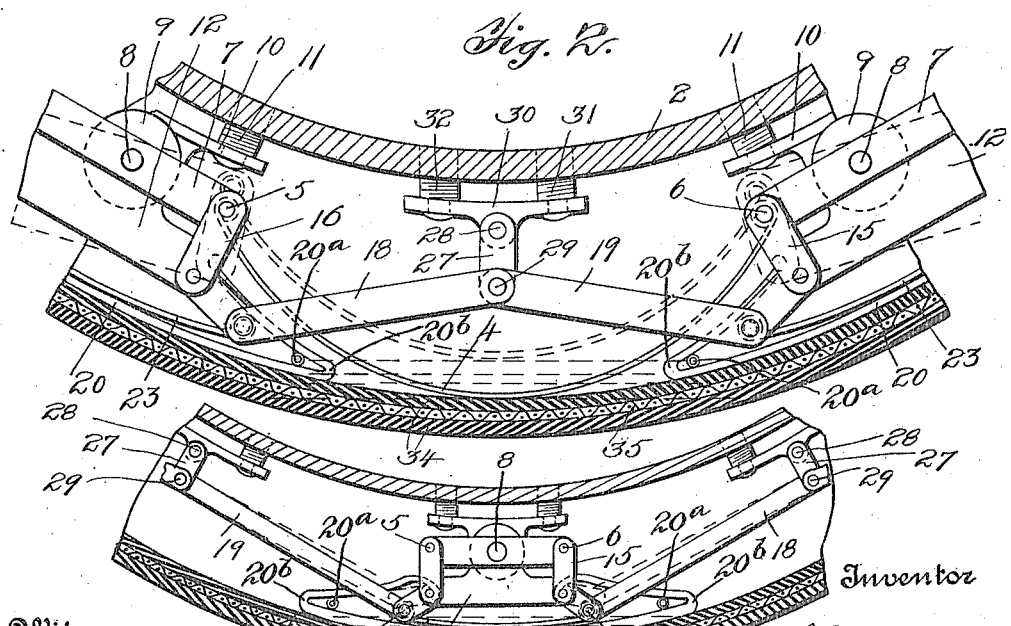
Fig. 2.
Fig. 3.
Witnesses
M. P. McKee
J. M. Bowie
Inventor
J. C. Eakens
Alex. J. Wedderburn, Jr.
Attorney

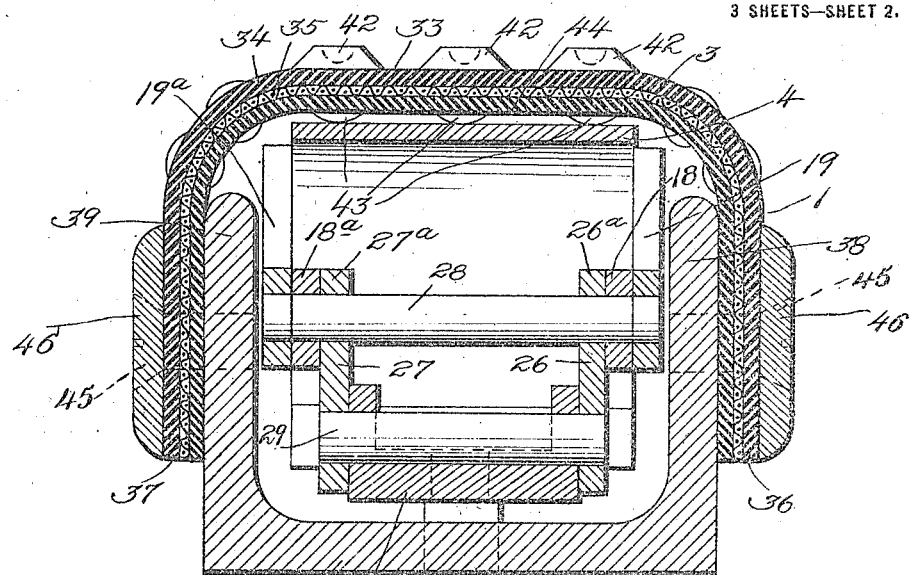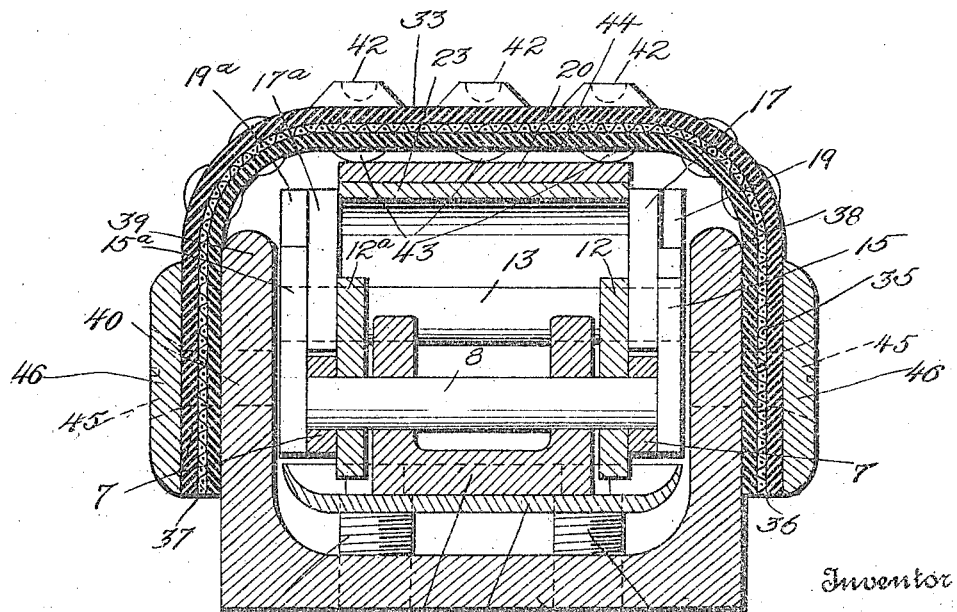

J. C. EAKENS.
TIRE FOR WHEELS.
APPLICATION FILED DEC. 9, 1914.

1,255,115.

Patented Jan. 29, 1918.
3 SHEETS—SHEET 3.

Witnesses
M. P. McKee
J. M. Bowie

Inventor
J. C. Eakens

By Alex. J. Wedderburn, Jr.
Attorney

UNITED STATES PATENT OFFICE.

JAMES C. EAKENS, OF GOLDEN, NEW MEXICO.

TIRE FOR WHEELS.

1,255,115.  Specification of Letters Patent.  Patented Jan. 29, 1918.

Application filed December 9, 1914. Serial No. 876,385.

*To all whom it may concern:*

Be it known that I, JAMES C. EAKENS, a citizen of the United States, residing at Golden, in the county of Santa Fe and State of New Mexico, have invented certain new and useful Improvements in Tires for Wheels, of which the following is a specification.

This invention relates to improvements in tires for wheels and has for its object to provide a resilient tire having means whereby pressure anywhere upon the tire casing will be distributed throughout the tire.

Another object of the invention is to provide a tire having a series of spring controlled levers whereby pressure upon any part of the tire may be distributed to all parts thereof.

With the above and other objects in view which will hereinafter be more fully explained, I have invented the device illustrated in the accompanying drawings in which—

Figure 7:
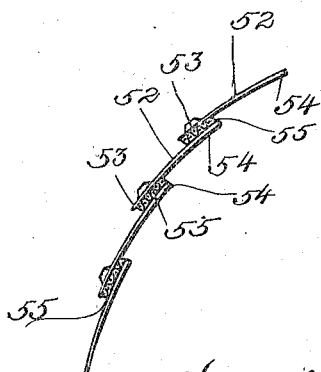
Figure 6:
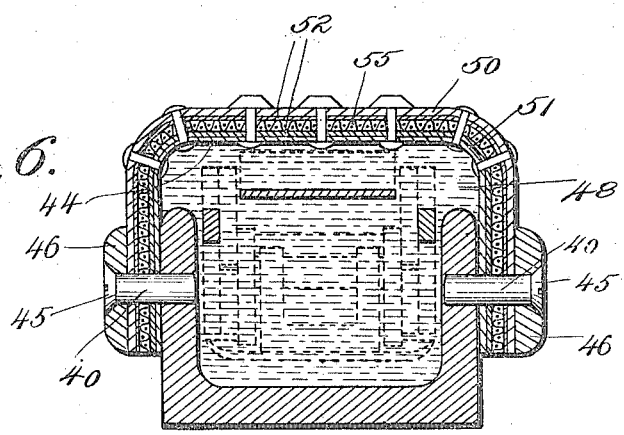
Figure 8:
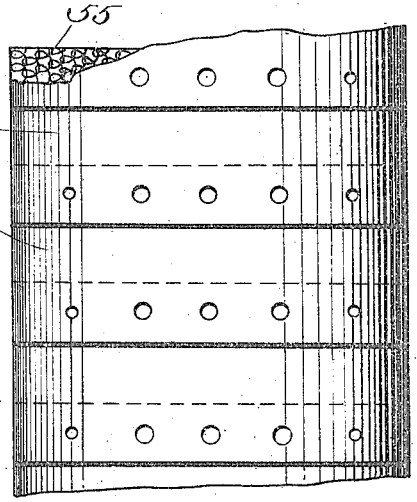

Figure 1 is a sectional elevational view of a portion of the improved tire,

Fig. 2 is a similar view on a larger scale, showing in dotted lines the relation assumed by the parts when the tire is subjected to an abnormal pressure, Fig. 3 is a longitudinal section through the tire, spring 4 being omitted, Fig. 4 is an enlarged sectional view taken on line A—A of Fig. 1, Fig. 5 is a similar view taken on line B—B of Fig. 1, Fig. 6 is a cross sectional view of the device showing the same filled with oil, Fig. 7 is a detail longitudinal sectional view of a modified form of intermediate stiffening device of the tire casing, and Fig. 8 is a top plan view thereof.

Like reference characters indicate like parts throughout the specification and in the various views in the drawings in which 1 indicates a resilient tire formed of a channeled rim 2 and a casing 3 which are held spaced apart by a series of bowed springs 4 having their opposing ends pivoted to the pins 5 and 6 that are carried by the levers 7. These levers are in turn pivoted to the pins 8, mounted in the bearings 9, integrally or otherwise connected to the plates 10 which are secured by screw bolts 11, to the channel rim 2. Also pivotally mounted upon the pins 8 are levers 12 and $12^a$ which are connected at their opposing ends by pins 13 and 14, upon the outer ends of which are mounted links 15 and $15^a$ and a pair of links 16. The opposing ends of these latter links are secured to the outer ends of said pins 5 and 6. Also pivotally mounted upon the pins 13 and 14 are links 17, $17^a$, and a pair of links $17^b$, the other ends of which are pivoted to a pair of relatively long links 18 and $18^a$, 19 and $19^a$. Springs 20 are bowed to conform to the arc of the periphery of the casing 3 and their ends 21 and 22 returned inwardly and curved to conform to the arc of the springs 4 and are seated between said springs 4 whereby a practically continuous peripheral surface is formed by said springs 4 and 20 upon which said casing seats. The ends of the springs 20 are returned and are pivotally fixed to the bolts 13 and 14 carried by the links 15 and 16. Bowed springs 23 are provided to reinforce the springs 20, and have their ends connected to the pins 24 and 25. The ends 21 and 22 of the spring 20 are bent over the bars or pins $20^a$ which may be held by solder or in any suitable manner, whereby said returned portions cannot be pressed flat against the main portion of the spring at the bend $20^b$ thus lessening danger of the spring from breaking at said bend.

The inner ends of the links 18 and $18^a$, 19 and $19^a$ are pivoted to the ends $26^a$ and $27^a$ of the links 26 and 27 by means of the pins 28, the other ends of said links 26 and 27 being pivoted by means of the pins 29 to the bearing members 30 which are mounted upon the rim 2 by means of the bolts 31 and 32.

The bearing members 30 and 9 together with their lever link connections alternate with one another entirely around the channel member 2 and are suitably spaced apart in order to perform their respective functions.

It will be seen from the above description that pressure upon any part of the surface 33, will by means of the various springs, links and levers be distributed throughout the entire circumference of the tire 1.

The casing 3 is made preferably of rubber 34 in which is intermeshed a reinforcing device 35. The opposing edges 36 and 37 of said casing are bent at right angles thereto and are secured to the side walls 38 and 39 of said channel rim 2 by means of bolts 40 which have heads 45 countersunk in the casing clamp rings 46 so they cannot be damaged by contact with any object. The several sections of said casing are held together with rivets having outer heads 42 which act as anti-skidding devices and inner heads 43 which will contact with the springs 4 and 20 thereby preventing frictional contact between said springs and the inner surface 44 of said casing 3. The tire is nearly filled with oil or a very thick lubricating grease 48 in order to keep the parts thoroughly lubricated and also to prevent too sudden action on the parts which will be controlled in their movement by their necessary passage of the lubricant from one part of the tire to another part thereof.

The stiffening device shown in Figs. 7 and 8 which may be inserted between the layers of rubber or other suitable material 50 and 51, as shown in Fig. 6, is formed of a plurality of sections 52 the feather edge portions 53 of which overlap the portions 54 of the adjacent sections and are held apart by resilient wire mesh 55 in order that the treads will be very resilient and give freely to any unevenness on the road and also in order that the members 52 may readily move over one another.

Having now described my invention that which I claim to be new and desire to procure by Letters Patent is:—

1. The described device consisting of a pair of channel members, bearing members on the inner of said channel members, levers pivoted to said bearing members and springs connecting said levers, said springs being arcuate and having loose bearing against said outer member, springs having returned ends intermediate of said first springs, the last springs mounted on said levers and bearing against said outer member, other bearing members alternating with said bearing members, links pivoted thereto, long links pivoted to said links and short links pivotally connecting said long links and levers, and spring connecting the short links on one side of said lever to the short links on the other side of said lever.

2. A tire consisting of a pair of channel members, bearing members on the inner of said channel members, levers pivoted thereto and arcuate spring having inturned ends mounted on said levers and bearing against the outer of said members, leaf springs intermediate of said first springs, the ends of which overlap the inturned ends of the adjoining springs, said last springs being connected to adjacent levers.

3. A tire consisting of a pair of channel members, bearing members on the inner of said channel members, levers pivoted thereto and arcuate springs having inturned ends mounted on said levers and bearing against the outer of said members, leaf springs intermediate of said first springs, the ends of which overlap the inturned ends of the adjoining springs, said last springs being connected to adjacent levers, said first springs bearing upon said outer member, said outer member being flexible, and said inner member being inflexible.

4. A tire comprising a rim member, an encircling outer member, spaced levers pivoted to the rim member, bowed springs interposed between the levers for supporting the outer member and each connected at its ends to the opposing ends of adjacent levers, other bowed springs for supporting the outer member alternating with the first springs and each arranged outwardly of a respective lever with its ends connected to the ends of the latter.

5. A tire comprising a rim member, an encircling outer member, spaced levers pivoted to the rim member, bowed springs interposed between the levers for supporting the outer member and each connected at its ends to the opposing ends of adjacent levers, other bowed springs for supporting the outer member alternating with the first springs and each arranged outwardly of a respective lever and extended circumferentially beyond the opposite ends thereof, the ends of each of the second springs being returned and connected to the opposite ends of the respective lever.

6. A tire comprising a rim member, an encircling outer member, a plurality of levers each pivoted between its ends on the rim member, and a bowed spring for each lever arranged outwardly thereof with its ends extended circumferentially beyond the ends of the lever and returned for securement to the latter.

7. A tire comprising a rim member, an encircling outer member, a plurality of bowed springs for supporting the outer member, and a lever for each spring rockably carried by the rim member and having the opposite ends of the respective spring secured thereto.

8. A tire comprising a rim member, an encircling outer member, a plurality of bowed springs for supporting the outer member, a lever for each spring rockably carried by the rim member and having the opposite ends of the respective spring secured thereto, and means resiliently joining the opposing ends of adjacent levers.

9. A tire comprising a rim member, an encircling outer member, a plurality of bowed springs for supporting the outer member, a lever for each spring rockably carried by the rim member and having the opposite ends of the respective spring secured thereto, and outer member supporting springs joining the opposing ends of adjacent levers.

10. A tire comprising a rim member, an encircling outer member, a plurality of bowed springs for supporting the outer member, a lever for each spring rockably carried by the rim member and having the opposite ends of the respective spring secured thereto, outer member supporting springs joining the opposing ends of adjacent levers, and link means also connecting the opposing ends of adjacent levers.

11. A tire comprising a rim member, an encircling outer member, a plurality of bowed springs for supporting the outer member, a lever for each spring rockably carried by the rim member and having the opposite ends of the respective spring secured thereto, outer member supporting springs joining the opposing ends of adjacent levers, a plurality of bearing members alternately arranged with the levers, and a link connecting each end of the levers to the adjacent bearing member.

12. A tire comprising a rim member, an encircling outer member, a plurality of bowed springs for supporting the outer member, a lever for each spring rockably carried by the rim member and having the opposite ends of the respective spring secured thereto, outer member supporting springs joining the opposing ends of adjacent levers, a plurality of bearing members alternately arranged with the levers, a link connecting each end of the levers to the adjacent bearing member, and a spring arranged within each first spring and connecting the ends of the adjacent links.

13. A tire comprising a rim member, an encircling outer member, a plurality of bowed springs for supporting the outer member, a lever for each spring rockably carried by the rim member and having the opposite ends of the respective spring secured thereto, outer member supporting springs joining the opposing ends of adjacent levers, a plurality of bearing members alternately arranged with the levers, a link connecting each end of the levers to the adjacent bearing member, and spring means supporting the outer member radially of each lever and connecting the ends of the links that are connected to the respective lever.

14. A tire comprising a rim member, an encircling outer member, a plurality of bowed springs for supporting the outer member, a lever for each spring rockably carried by the rim member and having the opposite ends of the respective spring secured thereto, outer member supporting springs joining the opposing ends of adjacent levers, a plurality of bearing members alternately arranged with the levers, a link pivoted to each bearing member for swinging, and means connecting each end of the levers to the adjacent link.

15. A tire comprising a rim member, an encircling outer member, a plurality of bowed springs for supporting the outer member, a lever for each spring rockably carried by the rim member and having the opposite ends of the respective spring secured thereto, outer member supporting springs joining the opposing ends of adjacent levers, a plurality of bearing members alternately arranged with the levers, a link pivoted to each bearing member for swinging, a link connected to each end of the levers, a resilient connection between the links of each lever, and means connecting each second link to the adjacent first link.

16. A tire comprising a rim member, an encircling outer member, a circumferential series of outwardly bowed springs for supporting the outer member, means flexibly connecting the opposing ends of adjacent springs and supporting them from the rim member, and other springs alternating with the bowed springs and carried by the aforesaid means for supporting the outer member intermediate the points of support afforded by the bowed springs.

17. A tire comprising a rim member, an encircling outer member, a circumferential series of outwardly bowed springs for supporting the outer member, means flexibly connecting the opposing ends of adjacent springs and supporting them from the rim member, and other bowed springs alternating with the first springs and each comprising a central bowed portion affording a support for the outer member substantially the intervening distance between the adjacent first springs, and said central bowed portion having its ends extended inwardly and under itself and connected to said means.

18. A tire comprising a rim member, an encircling outer member, a circumferential series of outwardly bowed springs for supporting the outer member, means flexibly connecting the opposing ends of adjacent springs and supporting them from the rim member, other bowed springs alternating with the first springs and each comprising a central bowed portion affording a support for the outer member substantially the intervening distance between the adjacent first springs, and said central bowed portion having its ends extended inwardly and under itself and connected to said means, and a third series of bowed springs one arranged within each second bowed spring and having its ends flexibly connected to said means.

19. A tire comprising a rim member, an encircling outer member, spaced rockable means on one of said members, spring means interposed between and connected to the adjacent first means for supporting the other member, and other spring means arranged radially of each first means and carried directly by the latter for supporting said other member.

20. A tire comprising a rim member, an encircling outer member, circumferentially spaced levers pivoted between their ends on one member, and a bowed spring for each lever having its ends flexibly connected to the opposite ends of said lever for supporting the other of said members.

21. A tire comprising a rim member, an encircling outer member, circumferentially spaced levers pivoted between their ends on one member, a bowed spring for each lever having its ends connected to the opposite ends of said lever for supporting the other of said members, a link pivoted to each end of the levers, and a second bowed spring for each lever pivoted to the links at the opposite ends thereof.

22. A tire comprising a rim member, an encircling outer member, circumferentially spaced levers pivoted between their ends on one member, a bowed spring for each lever having its ends connected to the opposite ends of said lever for supporting the other of said members, a link pivoted to each end of the levers, and a spring arranged within each bowed spring and having its ends connected to the links carried by the respective lever for supporting said other member.

In testimony whereof I affix my signature in presence of two witnesses.

JAMES C. EAKENS.

Witnesses:
W. T. MIDDLETON,
W. H. DICKS.

Copies of this patent may be obtained for five cents each, by addressing the "Commissioner of Patents, Washington, D. C."